United States Patent [19]

Rosenbluth

[11] Patent Number: 5,134,685
[45] Date of Patent: Jul. 28, 1992

[54] NEURAL NODE, A NETOWRK AND A CHAOTIC ANNEALING OPTIMIZATION METHOD FOR THE NETWORK

[75] Inventor: David Rosenbluth, Brooklyn, N.Y.

[73] Assignee: Westinghouse Electric Corp., Pittsburgh, Pa.

[21] Appl. No.: 475,507

[22] Filed: Feb. 6, 1990

[51] Int. Cl.$^5$ .............................................. G06F 15/00
[52] U.S. Cl. ......................................... 395/21; 395/23
[58] Field of Search ....................... 364/513, 807, 900; 307/201; 395/21, 23

[56] References Cited

U.S. PATENT DOCUMENTS

| | | | |
|---|---|---|---|
| 4,660,166 | 4/1987 | Hopfield | 364/807 |
| 4,897,811 | 1/1990 | Scofield | 364/900 |
| 4,901,271 | 2/1990 | Graf | 364/807 |

OTHER PUBLICATIONS

Holler et al., "An Electrically Trainable Artificial Neural Network (ETANN) with 10290 'Floating Gate' Synapses", *Proceedings of the International Annual Conference on Neural Networks*, 1989, pp. 11-191-11-196.
S. Kirkpatrick, C. D. Gettatt, Jr., M. P. Vecchi, "Optimization by Simulated Annealing", *Science* May 13, 1983, vol. 220, No. 4598, pp. 671-680.
D. S. Johnson, C. R. Aragon, L. A. McGeoch, C. Schevon, "Optimization by Simulated Annealing: An Experimental Evaluation (Part I)", pp. 1-48.
H. Sompolinsky and A. Crisanti, "Chaos in Random Neural Networks", *Physical Review Letters*, vol. 61, No. 3, Jul. 18, 1988, pp. 259-262.
S. R. White, "Concepts of Scale In Simulated Annealing", *IEEE*, 1984, pp. 646-651.
D. H. Ackley, G. E. Hinton & T. J. Sejnowski, "A learning algorithm for Boltzmann machines", *Cognitive Science* 9:147-169, pp. 635-649.
C. Grebogi, E. Ott, J. A. Yorke, "Chaos, Strange Attractors, and Fractal Basin Boundaries in Nonlinear Dynamics", *Science*, vol. 238, Oct. 1987, pp. 634-637.
J. P. Eckmann, "Roads to turbulence in dissipative dynamical systems", *Reviews of Modern Physics*, vol. 53, No. 4, Part 1, Oct. 1981, pp. 643-654.
E. Ott, "Strange attractors and chaotic motions of dynamical systems", *Rev. Mod. Phys.*, vol. 53, No. 4, Part 1, Oct. 1981, pp. 655-671.
J. J. Hopfield & D. W. Tank, "Computing with Neural Circuits: A Model", *Science*, vol. 233, Aug. 8, 1986, pp. 625-633.
Yaser S. Abu-Mostafa & Jeannine-Marie St. Jacques, "Information Capacity of the Hopfield Model", *IEEE Transactions on Theory*, vol. IT-31, No. 4, Jul. 1985, pp. 461-464.
D. S. Ornstein, "Ergodic Theory, Randomness, and Chaos", *Science* vol. 24, Jan. 13, 1989, pp. 182-186.
J. J. Hopfield, "Neural networks and physical systems with emergent collective computational abilities", *Proc. Natl. Acad. Sci. USA*, vol. 79, pp. 2334-2338.
J. J. Hopfield and D. W. Tank, "Neural Computation of Decisions in Optimization Problems", *Biological Cybernetics*, 1985, pp. 141-152.
S. Kirkpatrick, C. D. Gelatt, Jr., and M. P. Vecchi, "Optimization By Simulated Annealing", pp. 1-52.
J. J. Hopfield, "Neurons with graded response have collective computational properties like those of two-state neurons", *Proc. Natl. Acad. Sci. USA*, vol. 81, pp. 3088-3092.
P. Smolensky, "Information Processing in Dynamical Systems: Foundations of Harmony Theory", *Parallel Distributed Processing*, vol. 1, pp. 194-317.

*Primary Examiner*—Michael R. Fleming
*Assistant Examiner*—Robert W. Downs
*Attorney, Agent, or Firm*—W. G. Sutcliff

[57] ABSTRACT

The present invention is a node for a network that combines a Hopfield and Tank type neuron, having a sigmoid type transfer function, with a nonmonotonic neuron, having a transfer function such as a parabolic transfer function, to produce a neural node with a deterministic chaotic response suitable for quickly and globally solving optimizatioin problems and avoiding local minima. The node can be included in a completely connected single layer network. The Hopfield neuron operates continuously while the nonmonotonic neuron operates periodically to prevent the network from getting stuck in a local optimum solution. The node can also be included in a local area architecture where local areas can be linked together in a hierarchy of nonmonotonic neurons.

11 Claims, 6 Drawing Sheets

NEURAL NODE, A NETOWRK AND A CHAOTIC ANNEALING OPTIMIZATION METHOD FOR THE NETWORK

BACKGROUND OF THE INVENTION

1. Field of the Invention

The present invention is directed to a neural network node, a network and a network optimization method that finds a near optimum network configuration for a problem rapidly and, more particularly, is directed to a node that includes a nonlinear response neuron, such as a Hopfield and Tank neuron, connected to a nonmonotonic neuron and to network architectures which take advantage of this node.

2. Description of the Related Art

Optimization problems consist of two components: a set of constraints and a cost function. The object of such problems, to find configurations of the problem elements which satisfy the constraints and minimize the cost function, becomes a difficult searching task when there are a large number of configurations satisfying the constraints while very few of these are of minimal cost. Fortunately, in many applications, near minimal solutions are usually good enough and hence heuristics can be used. A large number of difficult problems encountered in practical applications, perceptual problems in particular, such as target recognition, are optimization problems.

There has been a proliferation of methods for solving optimization problems using neural networks, most stemming from two fundamental approaches: a continuous deterministic method proposed by Hopfield and Tank; and a discrete stochastic approach called simulated annealing proposed by Kirkpatrick. Most implementations of these methods use some variant of the standard Hopfield neural network, a completely interconnected single layer of neurons with symmetric interconnections. Differences between implementations arise from the use of different types of transfer functions for the neurons and different types of updating for the network. The feature common to all approaches is their treatment of optimization as an energy minimization problem or a problem of finding minima on a high dimensional surface. A mapping of an optimization problem onto a neural network consists of a representation assigning interpretations to particular network states within the context of the problem, and an energy function incorporating the constraints and cost function of the problem associating the lowest energy to network states which both satisfy the constraints and have low cost. Since the contribution of the state of a single neuron to the global energy can be determined locally, based on the energy function, the connection weights between the neurons and the potential functions of the neurons can be designed so that the state of each neuron will only change in a manner which reduces the global energy of the network.

The Hopfield and Tank model embeds discrete problems into a continuous decision space by using neurons with continuous sigmoid type transfer functions. Since only discrete on/off states of the network are given an interpretation in the context of the problem to be solved, the continuous range of states which the network assumes in finding a solution, can be seen as the network searching through multiple discrete states, simultaneously. Comparisons between this and discrete space models where neurons can only assume values +1 or −1 show that the continuous model has vastly greater computational power. Since it is both deterministic and uses continuous time, as do biological neurons, the network is simply modeled with basic electrical components. The major drawback of this method, stemming from its determinism, is the fact that there is no way of avoiding poor local minima on the energy surface in which the network might become trapped.

Simulated annealing is a stochastic optimization method based on an analogy with the physical process of annealing crystals. The random local interactions of large ensembles of molecules which eventually lead the ensemble toward a state which is of globally minimal energy can be mimicked using a network of probabilistic threshold elements. These threshold elements behave so as to decrease the global energy whenever the possibility arises, but also are permitted to assume states which increase the global energy of the network with a probability which is inversely proportional to the size of the increase, and directly proportional to an adjustable parameter called temperature of computation. This network, called a Boltzmann machine, performs a gradient descent but can escape local minima on the energy surface by jumping to higher global energy states, and hence will, if left long enough, reach a minimal energy state. Foremost among the practical difficulties of this method is the problem of reducing the time needed to reach a globally minimal equilibrium. One method is to use cooling of the temperature parameter to speed the process of reaching equilibrium, but this requires finding a cooling schedule (how long to leave the network at each temperature of computation) which is as short as possible but still allows the network to come close to equilibrium at each temperature. Good cooling schedules become increasingly difficult to find empirically and increasingly critical to performance as the size of the network increases. In addition there is little known about the characteristics of optimal cooling schedules or how they depend upon the problem or implementation. It is also suspected that the components of optimization problems do not behave like ensembles of identical elements bringing into question the validity of cooling uniformly. Finally, this model lacks appeal in that discrete nondeterministic neurons do not fit into biological models and the global parameters of temperature and cooling schedule do not easily fit into a distributed representation.

SUMMARY OF THE INVENTION

It is an object of the present invention to provide a neural network node that is suitable for optimization problems.

It is also an object of the present invention to provide a node which helps a network globally optimize and avoid local minima.

It is another object of the present invention to provide networks that improve the rate of convergence of the network to a solution for an optimization problem.

The above objects can be achieved by using network nodes that combine a Hopfield and Tank type neuron with a nonmonotonic neuron that provides a deterministic chaotic response, and where the pair is suitable for quickly solving optimization problems. The node can be included in a completely connected single layer network. The node can also be included in a local area architecture where local areas can be linked together by a hierarchy of nonmonotonic neurons.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention combines the advantageous features of both the continuous and stochastic approaches and provides solutions to their disadvantages. The present invention modifies the Hopfield and Tank type neuron (hereinafter Hopfield neuron) so that it can avoid local minima. The present invention does not sacrifice the deterministic nature of the Hopfield neuron or introduce the problems related to finding cooling schedules. Neurons with simple nonmonotonic potential functions exhibit deterministic chaotic behavior. Chaos introduces the needed randomness while the determinism makes it possible to handle many of the problems with cooling schedules automatically and in a distributed fashion.

Figure 1:
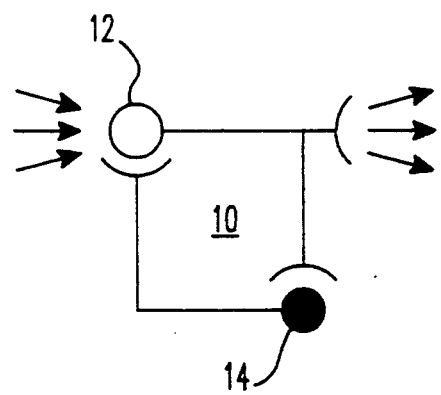
FIG. 1 illustrates a neural node in accordance with the present invention.
Figure 2:
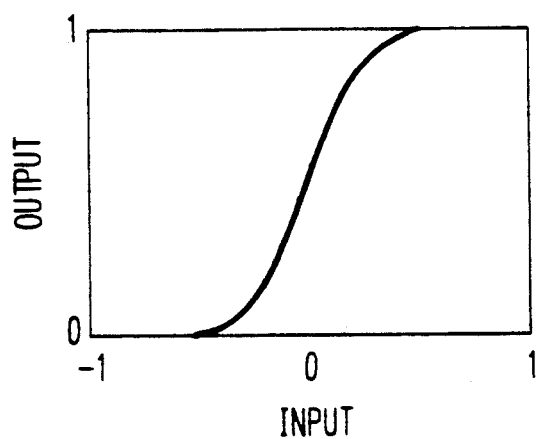
FIG. 2 illustrates a typical Hopfield and Tank neuron transfer or potential function.
Figure 3:
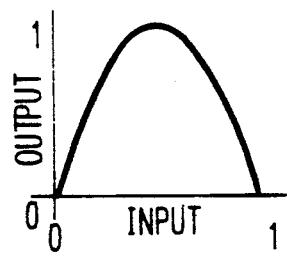
FIG. 3 illustrates a typical nonmonotonic neuron transfer function.

The neural node 10 of the present invention is illustrated in FIG. 1 and could be called a chaotic deterministic neuron. This node includes a conventional nonlinear Hopfield type neuron 12. This neuron 12 performs the typical weighted summation of inputs of signals which should be random and uses the weighted summation as an input to a potential or transfer function which produces an output. The transfer function is monotonic, typically increasing as illustrated in FIG. 2 which is a sigmoid function such as $\arctan^{-1}$. One of the inputs to the Hopfield neuron 12 is an output produced by a nonmonotonic neuron 14. The nonmonotonic neuron 14 receives as an input the output produced by the Hopfield neuron 12. As can be seen, the nonmonotonic neuron 14 is connected up in a feedback relationship with the Hopfield neuron 12. The addition of the output of the nonmonotonic neuron 14 to the input set of the Hopfield neuron 12 provides the random input which allows the node to find a global solution. The nonmonotonic neuron has a nonmonotonic transfer function such as the parabolic transfer function illustrated in FIG. 3. Of course, other nonmonotonic transfer functions, such as a triangular function can be used. The text "Principles of Mathematical Analysis" by Rudin available from McGraw Hill Co., New York 1976 describes the characteristics of nonmonotonic functions and is incorporated by reference herein. Among the nonmonotonic potential functions the parabolic transfer function on the unit interval is presently preferred because it is the simplest and best understood of the nonmonotonic transfer functions exhibiting chaotic iterated behavior.

The Hopfield neuron 12 in this node 10 operates continuously, that is, each time there is a change in an input a change in an output occurs. If the neuron 12 is created from discrete components, such as resistors, inductors, capacitors and inverting and noninverting amplifiers, the change in the output occurs with some phase delay. If the neuron 12 is a computer program, the output changes each time the neuron 12 is updated. The neuron 14, however, operates periodically. If the neuron 14 is created from discrete components the connections between resistors, etc. would be changed periodically. If the neuron 14 is a computer program, the neuron 14 would produce a new output each time an update counter for neuron 12 counts a predetermined number of updates of neuron 12. Neuron 14, because of its periodic operation provides the step like or discrete changes in input, which accomplishes the annealing function while the deterministic nature of the nonmonotonic transfer function controls the annealing. The conventional annealing process is an enhanced version of known techniques of local optimization or iterative improvement in which an initial solution is repeatedly improved while making small local alterations until no alteration yields a better solution. Conventional simulated annealing randomizes this procedure in a way that allows for occasional uphill moves (changes that worsen the solution), in an attempt to reduce the probability of becoming stuck in a poor but locally optimal solution. Chaotic annealing, in contrast, by providing a feedback input based on a nonmonotonic transfer function provides alterations which will jump over the barriers between locally optimal solutions, so that a globally optimal solution can be found.

Figure 4:
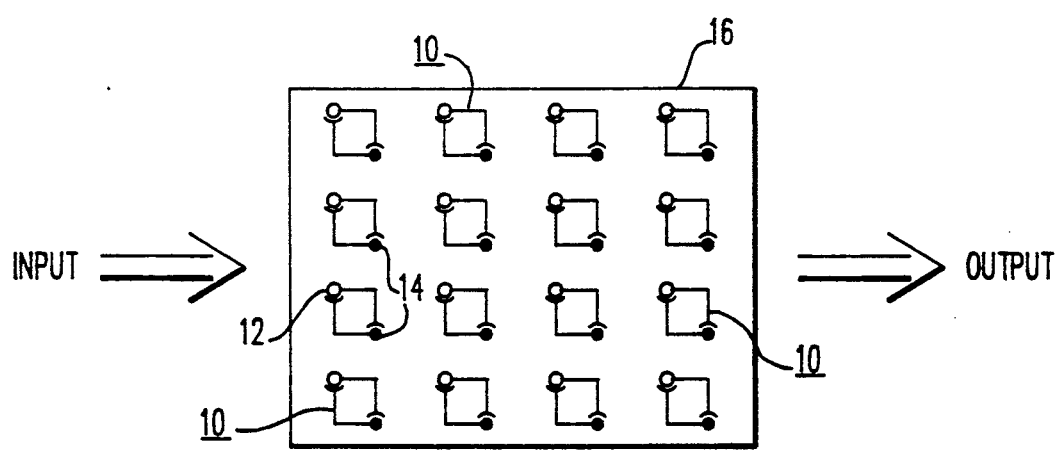
FIGS. 4-7 illustrate network architectures according to the present invention.
Figure 5:
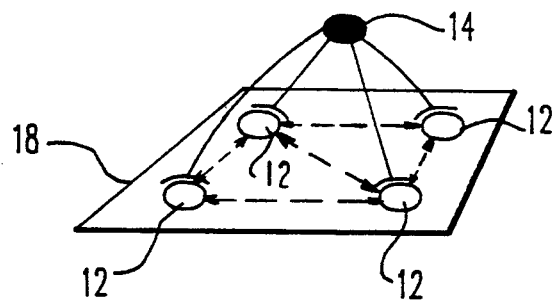
Figure 6:
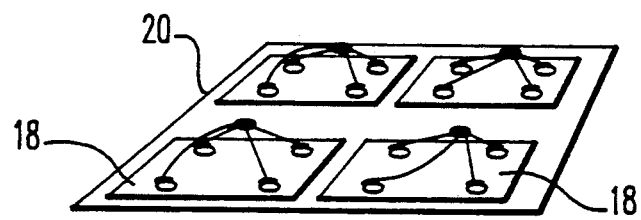
Figure 7:
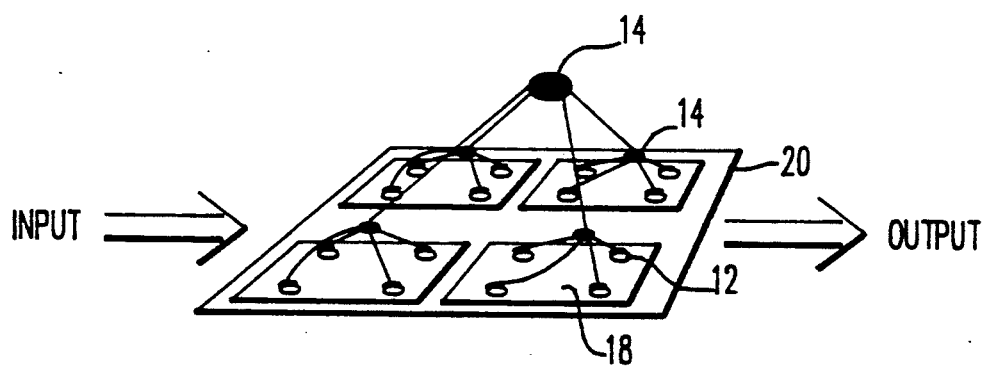

The operation of a discrete time implementation of the node 10 is governed by equations 1-6. The Hopfield neuron 12 is governed by:

$$i_{(j,t)} \sum_{i=1}^{N} (w_{ij}O_{(i,t-1)}) + r_{(j,t-1)} * n \quad (1)$$

$$O_{(i,t+1)} = \mathrm{sig}(i_{(j,t)}) \quad (2)$$

where $i_{(n,t)}$ is the input to the nth Hopfield neuron at time t, $O_{(n,t)}$ is the output of the nth Hopfield neuron at time t, sig(x) is a continuous sigmoid function such as $\arctan^{-1}$, $r_{(n,t)}$ is the output of the nth parabolic or nonmonotonic neuron at time t, $w_{ij}$ is the weight between Hopfield neurons i and j where $w_{ij}=w_{ji}$ and n is a normalization factor. The parabolic or nonmonotonic neuron 14 is governed by:

$$r_{(j,t)} = F_j(O_{n,t-1}) \quad (3)$$

where the input to the parabolic neuron at time t is $O_{(n,t)}$ and where $$F_j(O_{(j,t)}) = \lambda_{(j,t)} * i_{(j,t)} * (1 - i_{(j,t)}) \quad (4)$$

$$\lambda_{(n,t)} = L(t, I_{(j,k)}, \lambda_{(j,t-1)}) \quad (5)$$

where L is decreasing with time and L is a function of the past history of the inputs to the nonmonotonic from its Hopfield neuron, i.e. $I_{(j,k)}$ The preferred network architecture of the present invention is a completely interconnected network 16 of Hopfield neurons 12 each of which is connected to a dedicated nonmonotonic neuron 14, as illustrated in FIG. 4. In such a network the energy function defines the optimization problem and the final state of the neurons will indicate the solution of the problem. A completely interconnected network has input and output connections between all of the neurons 12 (see the dashed lines of FIG. 5 showing each node 12 receiving an input form the other nodes 12 and providing an output to the other nodes 12). The network 16 of FIG. 4 has symmetric weights as previously discussed. An alternative architecture includes a local neighborhood group 18 in which a group of completely interconnected Hopfield neurons 12 are connected to a single nonmonotonic neuron 14 as illustrated in FIG. 5. Although not shown in FIG. 5, the outputs of the local area neurons 12 are connected to the inputs of the local area nonmonotonic neuron 14. In this configuration the inputs to neuron 14 from neurons 12 are preferably averaged to produce a single input as in the FIG. 1 configuration and the output is identically applied to all neurons 12. It is of course possible to weight the inputs to the neurons 14 rather than simply average them. FIG. 6 illustrates a network of local area groups 18 that are completely interconnected at the Hopfield layer. A further version of the hierarchy is illustrated in FIG. 7 where layers of nonmonotonic neurons are created connecting the local area groups 18. In this architecture the Hopfield network includes layers of nonmonotonic neurons which communicate with the local groups 18 of neurons. In this architecture each level of neurons sends signals to the level beneath and receives signals from the level above with the lowest level being the Hopfield network. Each of the levels can be completely interconnected. The nonmonotonic neurons 14 preferably all have their inputs averaged while the Hopfield neurons 12 receive multiple inputs and weight them. It is of course possible to weight the inputs to neurons 14. In the implementation of FIG. 7 it is preferred that the various levels execute on different time scales. For example, the Hopfield level updates at the fastest update rate, the first nonmonotonic layer executes at a slower rate, for example after five iterations of the Hopfield layer; the second nonmonotonic layer executes when the first layer of nonmonotonic neurons has iterated several times, for example, five times, with this pattern continuing as more nonmonotonic layers are added. This allows the different layers to control different time scales in the annealing process. Other architectures which are problem dependent are also possible. For example, in a traveling salesman type optimization problem, which has characteristics similar to a wiring routing problem, each neuron 12 would represent a path from one city to another. These path representational neurons 12 could be arranged in a matrix with a nonmonotonic neuron 14 assigned to each row or column of the matrix. The weight between the Hopfield neuron ij and the corresponding nonmonotonic neuron would be proportional to the distance between cities i and j. The final state of the neurons 12 will indicate the route solution. It is also possible to have a hierarchical structure, as in FIG. 7, where the layers of nonmonotonic neurons are not completely interconnected and are chosen to exploit features of the problem being solved. It is also possible to provide the nonmonotonic neurons 14 with a random input provided by another nonmonotonic neuron in addition to inputs from the Hopfield neurons 12, this will effectively slow down changes in the control parameters for the nonmonotonic neuron 14 thereby increasing the variance of the input.

The present invention, as previously described, can be implemented as discrete nodes comprising discreet electrical circuit elements such as resistors in a resistor network. However, it is preferred that the present invention be implemented using one or more computers. In an environment where processors are inexpensive each node 10 can be a processor. It is also possible to implement a group of nodes 10 on a single processor, for example, each local area 18 can be implemented by a computer or each of the layers within a hierarchial structure can each be implemented by a computer. The selection of which method of implementation is chosen depends on a trade off between cost, network complexity and speed requirements. The approach of implementing plural nodes on a single computer will be discussed with respect to FIGS. 8-10. The interconnection matrix designated for the Hopfield neurons 12 and the nonmonotonic neurons 14 determines the type of architecture implemented.

Figure 8:
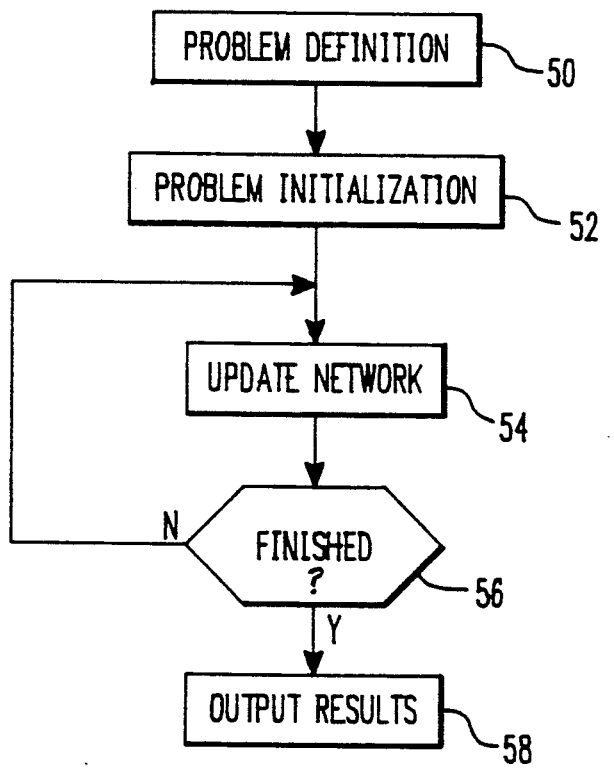
FIGS. 8-10 are flowcharts of a software implementation of the present invention in a single processor.

As illustrated in FIG. 8, execution of a neural network with nodes in accordance with the present invention can be broken down into five major steps which includes a loop that is executed until the output produced by the nodes 10 stabilizes. The first step 50 is to define the problem. This involves declaring all of the relevant variables used in the system where P is the number of Hopfield neurons, m is the number of nonmonotonic neurons, $f_i:[0,1]^P \rightarrow [0,1]$ is the activation function for the ith Hopfield neuron, for example, the sigma function, Gi is the activation function for the ith nonmonotonic neurons, for example, the parabolic function, $A_i \epsilon:[0,1]$ is the activation or output of the Ith Hopfield neuron, $R_i \epsilon:[0,1]$ is the activation of the ith nonmonotonic neuron, $A=[A_1, A_2, \ldots, A_n]$ is the activation vector, $R=[R_1, \ldots, R_m]$ is the random input vector, $\lambda_i:[0,1]$ is a control parameter for the ith nonmonotonic neuron, $\lambda=(\lambda_1, \ldots, \lambda_m)$ the control parameter vector, wij is the interconnection weight between the Hopfield neuron i and j, $MH=(W_{ij})$ the interconnection weight for the Hopfield neurons, MN is the interconnection matrix for the nonmonotonic neurons and Mhn is the interconnection matrix for the Hopfield and nonmonotonic neurons. An example of the use of the above terms when applied to different problems can be found Kirkpatrick et al. "Optimization by Simulated Annealing", IBM Watson Research Center, incorporated by reference herein. The next step 52 is to initialize the problem which will be discussed in more detail with respect to FIG. 9. Once the problem is initialized the execution loop for the network is entered and the first step therein is to update 54 the network. The updating of the network will also be discussed in more detail with respect to FIG. 9. After each network update, a test 56 is performed to determine whether the network has completed execution. It is possible to monitor any system to which the present invention is applied and determine the time scale associated with completing execution. When the network has completed execution the results are output 58.

Figure 9:
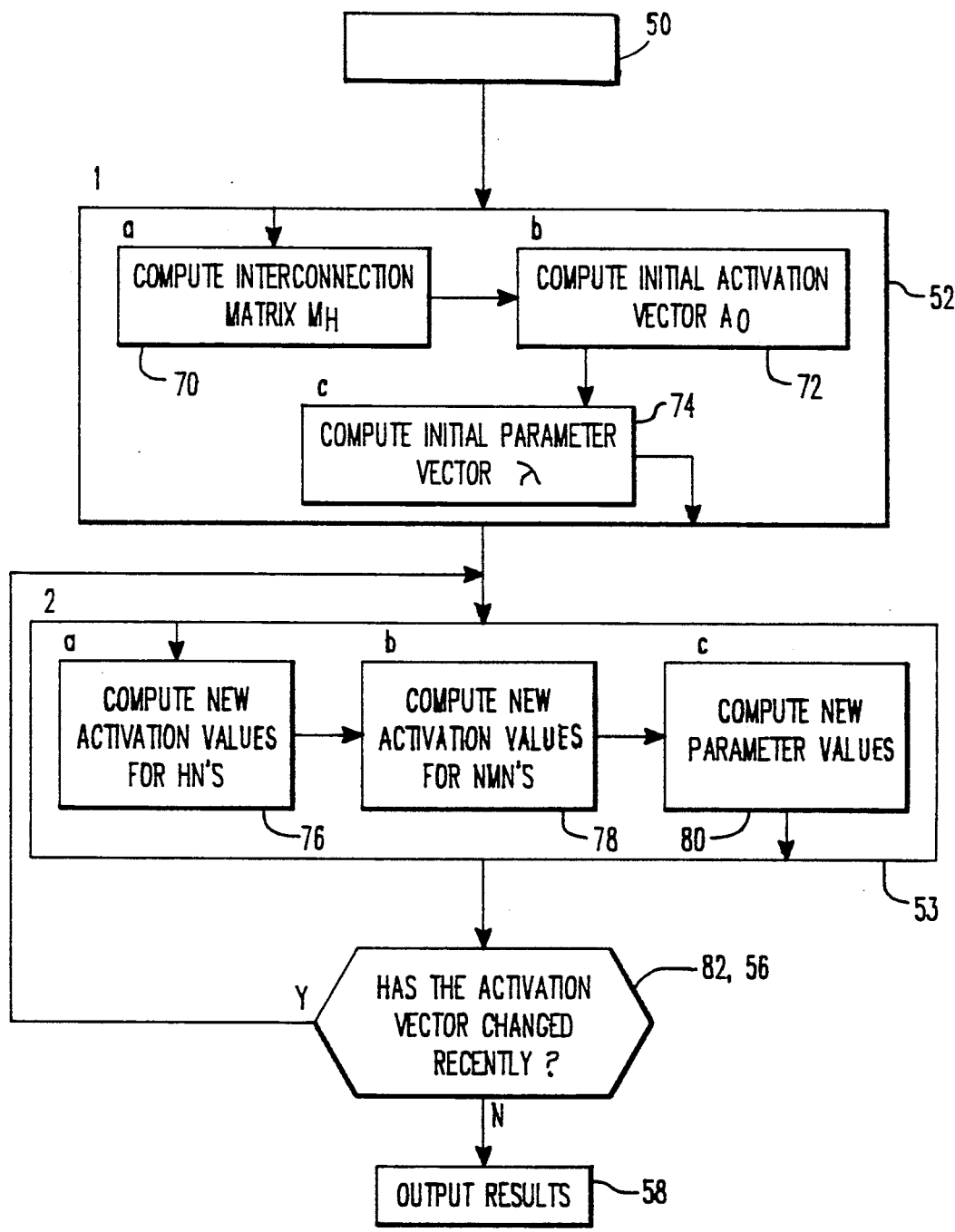

During problem initialization as illustrated in FIG. 9, the first step is to determine 70 an interconnection matrix followed by determining 72 an initial activation vector $A_0$. A discussion of how to perform these two steps can be found in "Optimization By Simulated Annealing" by Kirkpatrick et al., Science, Vol. 220, No. 4598, May 13, 1983, pages 671-679 or in "Optimization by Simulated Annealing: An Experimental Evaluation" (Part I), all incorporated by reference herein. Once the initial activation vector is determined the initial parameter vector is determined 74. This step will be discussed in more detail with respect to FIG. 10. Updating 53 of the network can be broken down into three steps 76–80. In the first step new activation values are computed 76 for the Hopfield neurons 72. Next the activation values for the nonmonotonic neurons 14 are computed 78. Then new parameter values are computed 80 as illustrated in FIG. 9. The test 82 for whether the network has finished computing is to determine whether the activation vector has recently changed. A suitable test is to compare the activation vector for 100 iterations and if it has not changed, the computations are finished.

Figure 10:
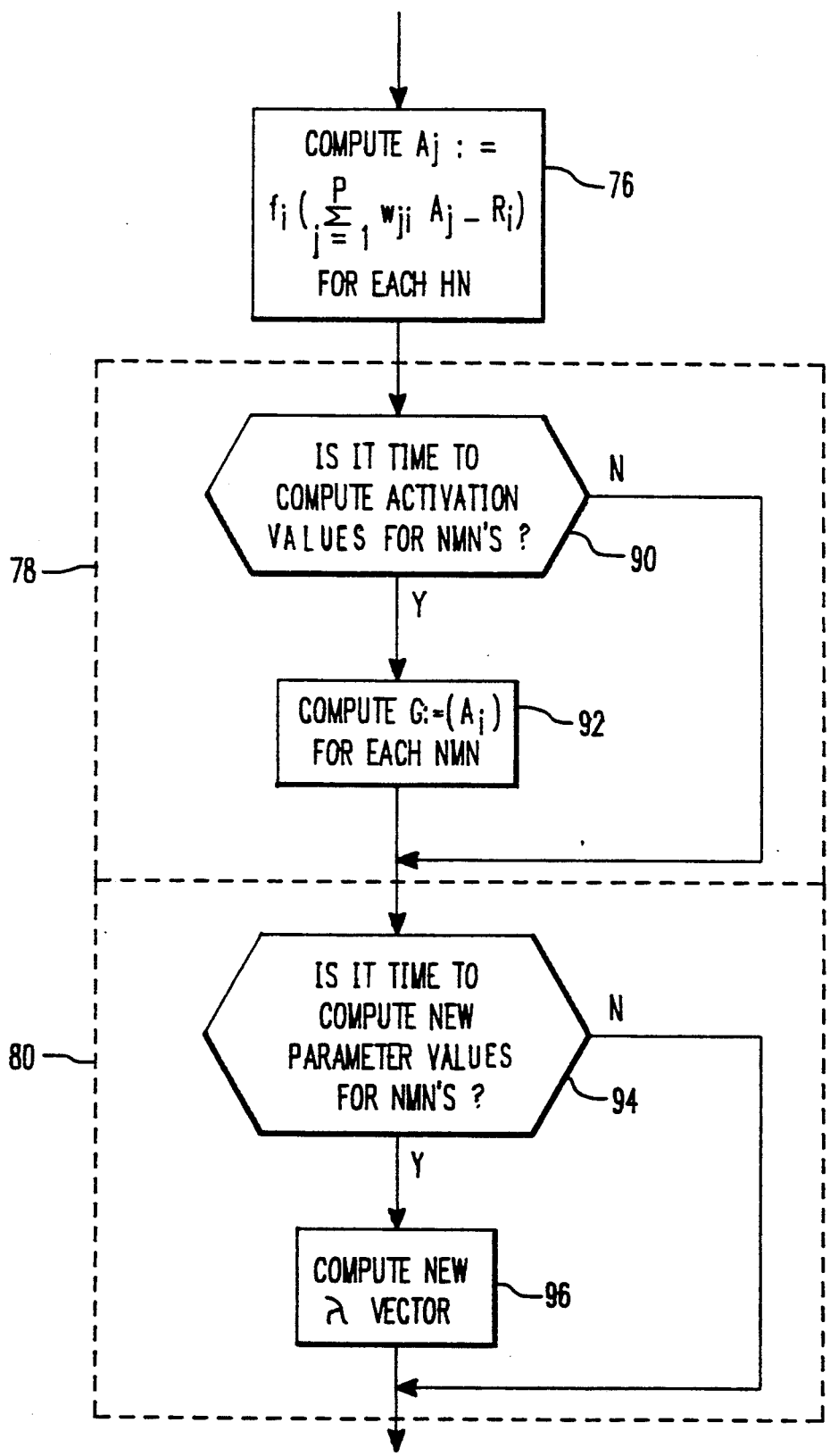

As illustrated in FIG. 10, computing the activation values for the Hopfield neurons involves performing the equation illustrated in the box indicated by reference numeral 76 where the function executed is for example a sigmoid function. During the computation of new activation values for the nonmonotonic neurons, a determination is made 90 as to whether it is time to compute new activation values for the nonmonotonic neurons. This time can be an arbitrary number of iterations of step 76, however, this time period between changes in the network made by the nonmonotonic neurons should be chosen so that the network can settle into a local minimum before the jump in state caused by the nonmonotonic neuron occurs. For example, five iterations of the Hopfield neurons 12 before the nonmonotonic neuron 14 is iterated would be appropriate. If it is time for updating the nonmonotonic activation values, then the activation values are computed 92 using a function such as the parabolic function. In the parameter computation step 80, the system also determines 94 whether it is an appropriate time for computing new parameter values. This time period can be the same or different from the time period previously discussed, for example, three to five iterations of the nonmonotonic neurons 14 for a single iteration on the control parameters is appropriate. If it is time, then a new vector is computed 96.

The timing relationship between the execution of the Hopfield neurons 12 and the periodic operation of the nonmonotonic neurons 14 effects a cooling schedule transition for changes in computation temperature. Differences in the timing allow differences in transitions between nodes to be implemented. By allowing each nonmonotonic neuron transfer function to change by updating the control parameters, the cooling schedule of each node 10 is allowed to be different. This provides a vector type cooling schedule which allows the cooling schedule to be locally optimized. The modification of the control parameters for the nonmonotonic neurons 14 effects the computational temperature of the cooling schedule for each node of each transition. As the control parameter for a neuron 14 is decreased, the parabolic neuron is cooled, thereby bringing the neuron 14 from chaotic to periodic to stable behavior. By appropriate scaling, the stable state can be zero and the approach to this state can be seen as the neuron 14 supplying smaller and smaller random excitatory and inhibitory inputs to the Hopfield neuron 12, since the range of the periodic inputs becomes increasingly restricted about zero as the neuron 14 approaches stability. This allows the system to naturally create or learn a good cooling schedule for the type of problem being solved. By computation temperature we mean the parameter which governs how high an increase in global energy is permissible in changing the state of the network. At each temperature and for each amount of change in the energy, there is a fixed probability of accepting the change in energy. This can be formalized as a continuous probability distribution function such as a Gibbs distribution. Each value of the control parameter is analogous to a specific temperature of computation.

During operation of a network in accordance with the present invention in a target or image recognition problem, the network would be presented with an image in the form of initial activation values for the network. The control parameters of the system would continue to decrease as the network assumes different states, until all the parameters are at a value which corresponds to a frozen temperature of computation. At this point the network will be in a state which will no longer change and represents the decision the network has made about the object. The control parameters of the network would then be frozen and the network would then be used to recognize real world objects.

As previously mentioned, fi is a sigmoid function with a continuous input and output. As a result, the network can be modeled as a system of coupled differential equations with a continuous time variable. Gi is a nonmonotonic map of the interval [0,1] which updates in discreet time steps. An example of this type of function, as previously mentioned, is the parabolic map $Gi(Ai)=4\lambda_i Ai(1-Ai)$ where $\lambda_i$ is the control parameter analogous to the synaptic weights of the Hopfield neurons. The significant characteristics of such an appropriate function are that it be nonmonotonic and have an adjustable control parameter. Initially all control parameters $\lambda_i$ in the control parameter vector will be identical and will have a value which is dependent upon the nonmonotonic function Gi. $\lambda$ should initially be chosen between a value of 0.5 and 2.7 and preferably 2.7. A detailed discussion of how to set the initial control parameter values depending on the nonmonotonic function selected can be found in "Iterated Maps On The Interval" by Collet and Eckmann, Birkhauser, New York 1980, incorporated by reference herein. The general rules for changing the parameter vector in step 96, in order of importance, require that each control parameter $\lambda_i$ separately decrease with time (number of iterations) at a rate sufficient to guarantee the damping of variables exciting the system and hence guaranteeing the convergence of the network, increase as the average of the inputs to the nonmonotonic neuron i approaches zero and decrease as the average approaches either negative one or one, hence preventing the system from settling into a meaningless or vague solution and decrease as the variance of the input decreases. By having the randomness decrease as the neuron is showing some commitment to a decision (either 1 or −1), the commitment to a decision is increased and the chances of knocking the neuron out of the commitment state are reduced. Computation of the updated control parameters requires variables internal to the monotonic neuron for computation of the average and variance. These values only take into account the inputs to the nonmonotonic neuron at the time of the update and not values (which will be changing) between updates.

An important feature of the present invention, as previously discussed, is its use of an extended concept of temperature. The present invention uses an N dimensional control vector to describe the temperature when the network has N neurons, hence extending the single scalar parameter for the whole network (or a whole solution) used in simulated annealing to a vector whose components apply to individual neurons (or elements of the solution).

Another advantage of the node 10 of the present invention is that the cooling process is directly linked to the performance of the network, both long term by learning a good cooling schedule and in the short term by making cooling sensitive to the immediate history of the annealing process. This eliminates the need for external control of cooling.

A further advantage of the present invention is the ability to adjust the computational temperature at each transition for each node individually. This can be accomplished by having the control parameter governed by a function such as $L_i(k_i, t, I_i)$ where $k_i$ is the current value of the control parameter, t is time and $I_i$ is a statistic about the recent firing history of the Hopfield neuron 12 to which the nonmonotonic neuron 14 is connected. The nonmonotonic neuron response is then generated by $f(x) = c(k, t, H)*(1-x)$. With a function that allows the control parameter to decay with time and varies inversely with the rate of firing of the Hopfield neuron 12, as previously discussed, individualized temperature adjustment is accomplished.

The Hopfield neuron and network, though fast and able to find good solutions by exploiting a continuous search space, cannot avoid local minima and hence often produces solutions which are far from optimal. Simulated annealing, though it is guaranteed to be a good solution, is slow and certain essential components of the model (like cooling schedules) are difficult to find. The present invention has advantages over a simulated annealing Hopfield network in that it acts on a continuous search space giving it the computational power of the Hopfield model, uses randomness to avoid local minima and guarantee good solutions, uses adaptive control of the randomness alleviating the need to find cooling schedules and is deterministic and computationally simple, making implementation easy in a variety of processor configurations. The present invention improves the performance of neural networks in applications such as automatic target recognition, battle management and ballistic missile defense.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the nonmonotonic neurons have been described as essentially operating discretely, they could of course operate continuously.

What is claimed is:

1. A neural network, comprising:
a layer of nodes comprising first nodes and a second node connected to all said first nodes, said second node receiving input signals from all said first nodes and providing a neuron output signal to all said first nodes, each of said first nodes comprising:
first neuron including means for receiving the input signals and producing the neuron output signal, and said second node comprising
nonmonotonic neuron means connected to said first neuron for providing a nonmonotonic signal as one of the input signals to said first neuron means responsive to the neuron output signal from said first neuron means, said nonmonotonic neuron means comprising parabolic transfer function means.

2. A neural network node, comprising:
a first neuron including means for receiving input signals and producing a neuron output signal; and
nonmonotonic neuron means connected to said first neuron means, for providing a nonmonotonic signal as one of the signals to said first neuron responsive to the neuron output signal from said first neuron and for providing the one of the input signals at a first rate and said first neuron including means for producing the neuron output signal at a second rate faster than said first rate.

3. A node as recited in claim 1, wherein said nonmonotonic neuron means has a control parameter and means for modifying the one of the input signals responsive to the control parameter and the control parameter being updated at a third rate by said nonmonotonic neuron means.

4. A neural network node, comprising:
a first neuron including means for receiving input signals and producing a neuron output signal; and
nonmonotonic neuron means connected to said first neuron, for providing a nonmonotonic signal as one of the signals to said first neuron responsive to the neuron output signal from said first neuron and said first neuron including means for operating continuously and said nonmonotonic neuron including means for operating periodically.

5. A neural network node, comprising:
monotonic neuron means for receiving input signals and producing output signals at a first rate; and
nonmonotonic neuron means connected to said monotonic neuron means, for providing one of the input signals to said monotonic neuron means responsive to one of the output signals of said monotonic neuron means at a second rate slower than the first rate, having control parameters and means for modifying the one of the input signals responsive to the control parameters, the control parameters for a nonmonotonic transfer function being changed at a third rate slower than the second rate.

6. A neural network, comprising:
monotonic neurons completely interconnected with each other and producing monotonic outputs; and
nonmonotonic neurons corresponding to each monotonic neuron and each nonmonotonic neuron connected in a feedback loop with the corresponding monotonic neurons and providing a nonmonotonic input to the corresponding monotonic neuron.

7. A neural network, comprising:
groups of monotonic neurons where neurons within each group are completely interconnected and produce monotonic outputs; and
a nonmonotonic neuron corresponding to each group, said nonmonotonic neuron for each group connected to each of said monotonic neurons with each corresponding group and said nonmonotonic neurons being completely interconnected to each other and each providing a nonmonotonic input to said monotonic neurons within each group.

8. A neural network, comprising:
a first layer arranged in groups of monotonic neurons, each group being completely interconnected and producing monotonic outputs, the monotonic neurons being of a first number;
a second layer of nonmonotonic neurons of a second number less than the first number, each of said nonmonotonic neurons of said second layer being connected to each of the monotonic neurons in one of the groups of said monotonic neurons and providing a nonmonotonic input to each of the monotonic neurons in the one of the groups, and said second layer of nonmonotonic neurons being arranged in groups; and a third layer of nonmonotonic neurons of a third number less than the second number, each of said nonmonotonic neurons of said third layer being connected to each of the nonmonotonic neurons in one of groups of neurons of said second layer and providing a nonmonotonic input to each of the nonmonotonic neurons in the one of the groups of neurons of said second layer.

9. A network as recited in claim 8, wherein said neurons of said second layer are completely interconnected.

10. A neural network, comprising:

a layer of nodes comprising first nodes and a second node connected to all said first nodes, said second node receiving input signals from all said first nodes and providing a neuron output signal to all said first nodes, said first nodes comprising first neuron including means for receiving the input signals and producing the neuron output signal, and said second node comprising:

nonmonotonic neuron means connected to said first neuron means for providing a nonmonotonic signal as one of the input signals to said first neuron means responsive to the neuron output signal from said first neuron means, and said nonmonotonic neuron means includes means for providing chaotic annealing of the network.

11. A method of producing a neural network node output signal responsive to input signals, the input signals being provided by all other nodes in a network, said method comprising the steps of:

(a) receiving, by the node, the input signals from all the other nodes;

(b) producing, by the node, the neural network node output signal responsive to the input signals using a first transfer function;

(c) producing, by the node, one of the input signals responsive to the neural network node output signal using a nonmonotonic transfer function; and (d) sending then neural network node output signal to all the other nodes wherein step (c) includes producing, by the node, chaotic annealing of the network.

* * * * *